Jan. 30, 1951     W. H. GOMER     2,539,829
EMERGENCY AIR CONTROL VALVE FOR TRACTOR-TRAILER
AIR BRAKE SYSTEMS

Filed June 9, 1947     2 Sheets-Sheet 1

Inventor
William Henry Gomer

By Clarence A. O'Brien
and Harvey B. Jackson
Attorneys

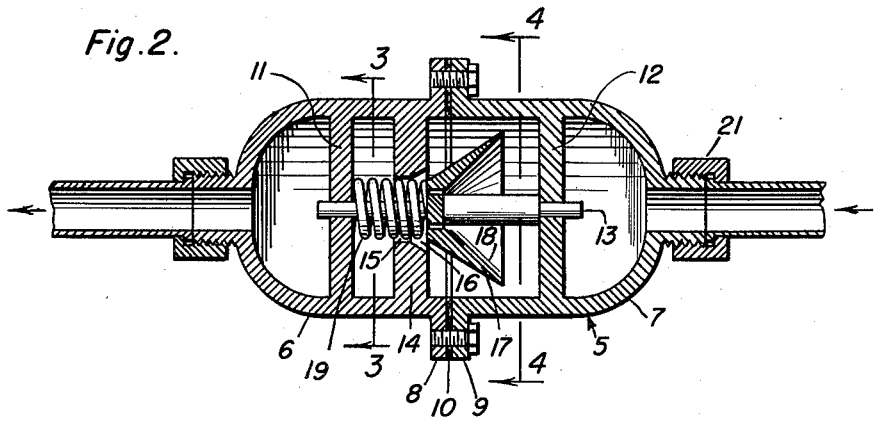
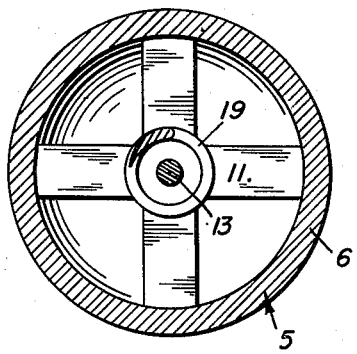
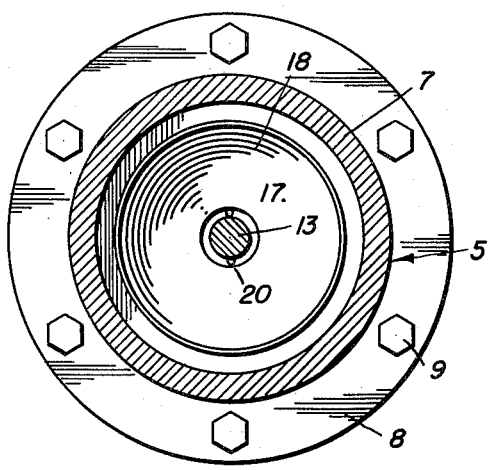
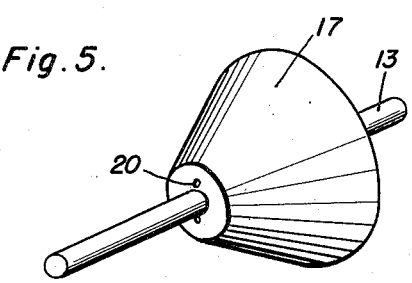

Patented Jan. 30, 1951

2,539,829

UNITED STATES PATENT OFFICE 2,539,829

EMERGENCY AIR CONTROL VALVE FOR TRACTOR-TRAILER AIR BRAKE SYSTEMS

William Henry Gomer, Nashville, Tenn., assignor of thirty-three and one-third per cent to Charles Louis McCoffrey, Nashville, and thirty-three and one-third per cent to Arthur J. Kirby, Davidson County, Tenn.

Application June 9, 1947, Serial No. 753,424

1 Claim. (Cl. 303—26)

The present invention relates to new and useful improvements in emergency air control valves to provide a safe and efficient control of air on tractor-trailer units using air brake systems.

Under present conditions, on equipment using air braking systems, a broken air line on the trailer will automatically bleed all air from the tractor, thus leaving it without braking means. The same type of air line failure will also cause an abrupt braking action on the trailer wheels, causing them to lock. Locked trailer wheels on an icy or wet highway result in very serious and costly accidents.

Accordingly, it is an object of the present invention to provide emergency air control valves in the air brake system and arranged to provide continuous braking power in the tractor system and to eliminate the possibility of locked trailer brakes in the trailer system.

A further object of the invention is to provide emergency air control valves at strategic points in the air brake system without necessitating any material changes or alterations in the construction or arrangement thereof.

A still further object is to provide a novel emergency air control valve structure as well as a novel arrangement of the valve unit in the air brake system for both the tractor and trailer.

A still further object is to provide a device of this character of simple and practical construction, which is efficient and reliable in operation, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 2 is an enlarged longitudinal sectional view of one of the emergency air control valves provided with bleeder ports;

Figure 3 and Figure 4 are enlarged transverse sectional views taken respectively on the lines 3—3 and 4—4 of Figure 2, and;

Figure 5 is a perspective view of the valve member.

Figure 1:
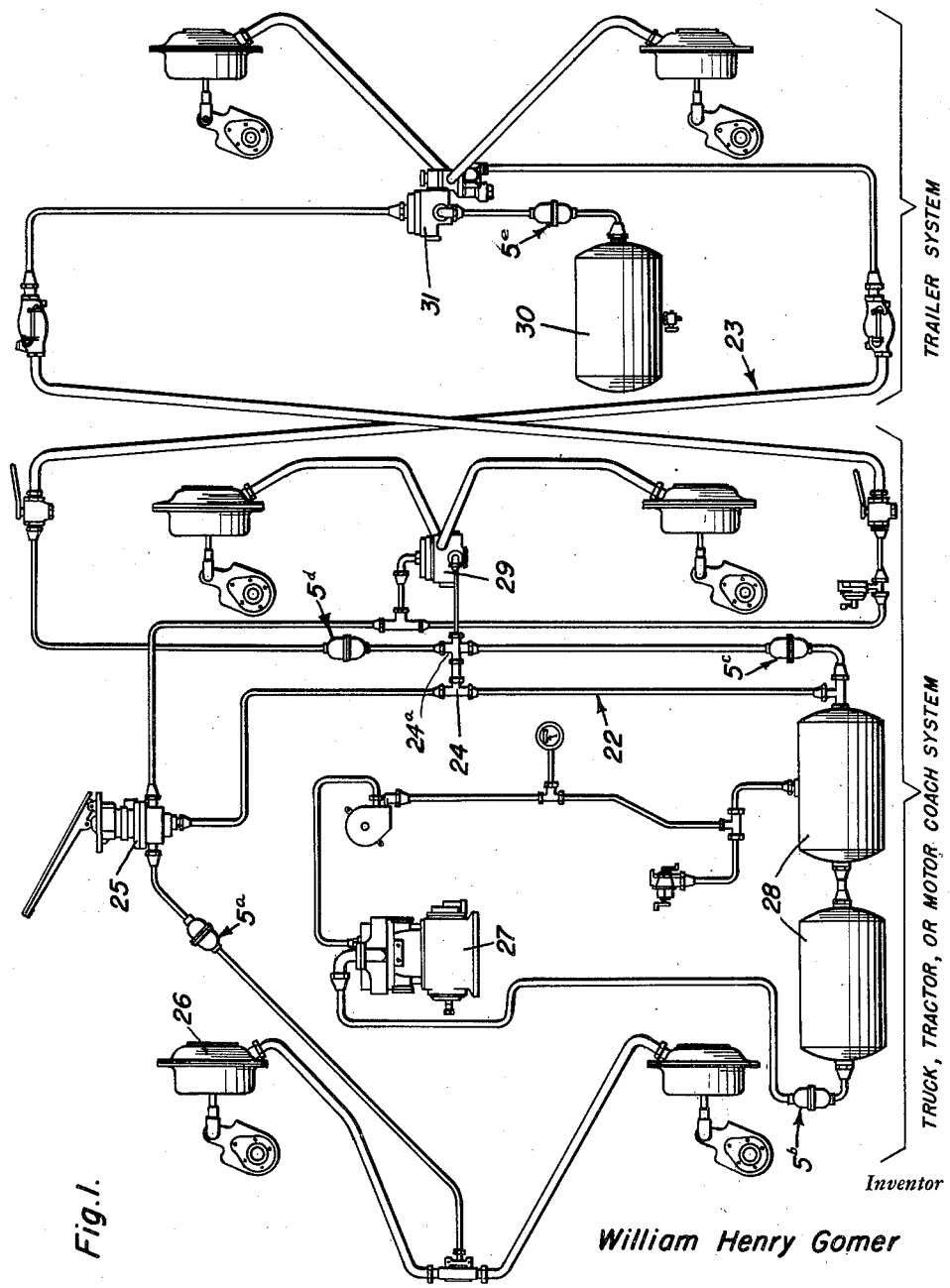
Figure 1 is a diagram of a typical installation of an air braking system of a truck or trailer and tractor.

Referring now to the drawings in detail wherein for the purpose of illustration I have disclosed a preferred embodiment of the invention, the numeral 5 designates a hollow valve body including a pair of sections 6 and 7 formed with flanges 8 at their abutting edges and secured to each other by bolts or screws 9 with a gasket 10 positioned between the flanges.

A spider 11 is cast or suitably secured in the section 6 of the valve body and a similar spider 12 is secured in the section 7 and in which the opposite ends of a valve stem 13 are slidably mounted.

The valve section 6 is also provided with a partition 14 between the spiders 11 and 12 and having a central opening 15 provided with a valve seat 16 at the side of the partition adjacent the connected end of the section 6.

A valve 17 of substantially frusto-conical shape is suitably secured or formed with the shaft 13, the valve being concaved at its wider end as shown at 18. The narrow or tapered end of the valve is adapted to seat on the valve seat 16 and the valve is yieldably held in an open position by a coil spring 19 mounted on the valve stem with one end abutting the spider 11 and its other end abutting the narrow end of the valve.

A plurality of bleed ports 20 extend longitudinally through the narrow end of the valve to provide for the uninterrupted passage of a limited amount of air through the valve body when the valve is in its closed position.

The outer ends of the valve sections 6 and 7 are formed with nipples 21 for attaching in an air brake system of a conventional type such as illustrated in Figure 1 of the drawings.

The air brake system includes a truck, tractor, or motor coach system indicated generally at 22 and a trailer system indicated generally at 23, the two systems being connected to each other by a T-fitting 24 and cross fitting 24a.

One of the emergency valves indicated at 5a in Figure 1, but without the bleeder ports 20, is connected in the air brake system 22 between the brake valve 25 and the front brake chambers 26.

A second emergency valve 5b, also without the bleed ports 20, is positioned between the compressor 27 and the reservoirs 28.

A third emergency valve 5c, also without the bleed ports 20, is positioned between the reservoirs 28 and the relay valve 29.

A fourth emergency valve 5d, also without the bleed ports 20, is positioned between the relay valve 29 and the trailer system 23.

A fifth emergency valve 5e, and provided with the bleed ports 20, is positioned in the trailer system between the trailer reservoir 30 and the relay emergency valve 31.

The valve 5a of the non-bleeder type is installed to hold the service line pressure between brake valve 25 and the front brake chambers in case of air line failure. In such event there would be no brakes on the front of the tractor, but working pressure would be maintained on the rear wheels of the tractor and on the trailer.

Valve 5b also of the non-bleeder type is installed to hold air pressure in the reservoir 28 in case of air line failure between compressor 27 and the reservoir.

Valve 5c also of the non-bleeder type is installed to hold air pressure in the reservoir 28 in case of air line failure between the reservoir and relay valve 29.

Valve 5d also of the non-bleeder type is installed to hold pressure in case of air line failure between relay valve 29 and trailer air system. The cross connection 24a between the two constant pressure lines supplies pressure to the relay valve 29 in case of air line failure between the relay valve and the trailer air system.

Valve 5e of the bleeder type prevents trailer brakes from locking in case of air line failure between the tractor and trailer or in the trailer air system. The bleeder port in valve 5e permits a regulated amount of air to bleed through the line and to apply brake pressure during a predetermined distance of travel to bring the unit to a safe stop.

In the operation of the device after the several valves have been connected in the system as indicated, normal working air pressure enters and passes through the valve bodies as indicated by the arrows in Figure 2, the valve 17 being held open by the spring 19 so that the air passes around the valve.

In case of air line failure in the trailer system, the air pressure entering the valve body forces the valve 17 into a closed position thus sealing off air from the brake shoe, except for the passage of a predetermined amount of air through the bleed ports 20. This action will gradually bring stronger braking pressure on the brake shoes as air escapes through the bleeders.

In case of air line failure in the tractor, the valves work on the same principle as explained above except that the valves in the tractor system are not provided with bleeder ports 20 and the air pressure in the tractor is trapped and the brakes operated in the usual manner.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

Having described the invention, what is claimed as new is:

In a combined air brake system for tractors and trailers and including a compressor, a pressure line leading from the compressor, a main reservoir connected to the pressure line, a pressure line leading from the main reservoir, a brake valve connected to the last-named pressure line, a front tractor brake chamber service line leading from the brake valve, a rear brake chamber service line leading from the brake valve to the rear tractor brake chambers and to the trailer brake chambers, a relay valve connected to the last named service line for the rear tractor brake chambers, a trailer emergency service line connecting the main reservoir directly to the trailer brake chambers, a branch pipe connecting the trailer emergency service line to the relay valve, A T-fitting connecting the pressure line leading from the main reservoir and the trailer emergency service line to each other, an automatic valve in the pressure line between the compressor and the main reservoir, an automatic valve in the front tractor brake chamber service line, an automatic valve in the trailer emergency service line between the reservoir and the branch pipe, an automatic valve in the trailer emergency service line between the branch pipe and the trailer brake chambers, a trailer reservoir connected to the trailer service line, and an automatic bleed valve in the connection for the trailer reservoir, all of said automatic valves closing by failure in the system controlled by said valves and said last-named automatic valve bleeding a regulated volume of air to prevent locking of the trailer brakes.

WILLIAM HENRY GOMER.

REFERENCES CITED

The following references are of record in the file of this patent:

UNITED STATES PATENTS

| Number | Name | Date |
| --- | --- | --- |
| 586,561 | Mosher | July 20, 1897 |
| 714,747 | Rowley | Dec. 2, 1902 |
| 834,855 | Woodman et al. | Oct. 30, 1906 |
| 2,018,212 | Johnson | Oct. 22, 1935 |
| 2,024,343 | Eaton | Dec. 17, 1935 |